United States Patent
Levine

(10) Patent No.: US 7,233,682 B2
(45) Date of Patent: Jun. 19, 2007

(54) SECURITY SCREENING SYSTEM AND METHOD

(76) Inventor: Michael C. Levine, 2073 Birch Bluff, Okemos, MI (US) 48864

( * ) Notice: Subject to any disclaimer, the term of this patent is extended or adjusted under 35 U.S.C. 154(b) by 0 days.

(21) Appl. No.: 11/194,421

(22) Filed: Aug. 1, 2005

(65) Prior Publication Data

US 2006/0098842 A1 May 11, 2006

Related U.S. Application Data

(60) Provisional application No. 60/598,165, filed on Aug. 2, 2004.

(51) Int. Cl.
*G06K 9/00* (2006.01)

(52) U.S. Cl. .......................... 382/101; 53/168; 378/57

(58) Field of Classification Search ................ 382/100, 382/101; 378/57, 62, 98.9; 705/1, 60, 401, 705/407, 408, 410, 8, 28, 406; 220/560, 220/560.01, 560.02, 560.08, 578, 579; 53/168, 53/445, 472, 473, 474; 700/216, 217; 707/1, 707/104.1, 102

See application file for complete search history.

(56) References Cited

U.S. PATENT DOCUMENTS

| 5,393,965 | A | * | 2/1995 | Bravman et al. ........... 235/383 |
| 6,003,010 | A | * | 12/1999 | Scolly et al. ................. 705/8 |
| 6,370,222 | B1 | * | 4/2002 | Cornick, Jr. ................. 378/57 |
| 6,687,326 | B1 | * | 2/2004 | Bechwati et al. ............. 378/7 |
| 6,690,997 | B2 | * | 2/2004 | Rivalto ...................... 700/237 |
| 6,707,879 | B2 | | 3/2004 | McClelland et al. |
| 6,721,391 | B2 | | 4/2004 | McClelland et al. |
| 6,721,762 | B1 | | 4/2004 | Levine |
| 6,816,571 | B2 | | 11/2004 | Bijjani et al. |
| 6,839,406 | B2 | | 1/2005 | Ries et al. |
| 6,856,667 | B2 | | 2/2005 | Ellengogen |
| 6,974,928 | B2 | * | 12/2005 | Bloom ....................... 209/583 |
| 7,085,677 | B1 | * | 8/2006 | Champlin et al. .......... 702/182 |
| 2003/0231739 | A1 | | 12/2003 | Rosner |
| 2004/0017888 | A1 | | 1/2004 | Seppi et al. |
| 2004/0022356 | A1 | | 2/2004 | Subotic et al. |
| 2005/0031076 | A1 | | 2/2005 | McClelland et al. |

* cited by examiner

*Primary Examiner*—Samir Ahmed
*Assistant Examiner*—Abolfazl Tabatabai
(74) *Attorney, Agent, or Firm*—Ian C. McLeod; Steven E. Merritt

(57) ABSTRACT

A method and system of security screening of packages before packages are shipped by a commercial shipper. The method and system compares the configuration of the contents of the package when it is packed to the configuration of the contents of the package just prior to placement of the package on a commercial carrier. A first image of the configuration of the contents of the package is created when the package is packed. A second image of the configuration of the contents of the package is created by scanning the package at the shipping station. The images are compared to determine whether the images are the same within preset parameters. The package is segregated if the image differs beyond a preset amount.

44 Claims, 3 Drawing Sheets

SECURITY SCREENING SYSTEM AND METHOD

CROSS-REFERENCE TO RELATED APPLICATIONS

This application claims the benefit of U.S. Provisional Application Ser. No. 60/598,165 filed Aug. 2, 2004.

STATEMENT REGARDING FEDERALLY SPONSORED RESEARCH OR DEVELOPMENT

Not Applicable

BACKGROUND OF THE INVENTION (1) Field of the Invention

The present invention relates to a method and system for security screening of cargo or packages prior to shipping of the cargo by air, land or sea by any means of commercial carrier. In particular, the present invention relates to a method and system for security screening of packages by comparing the initial configuration of the contents of the package with the configuration of the contents of the package prior to shipping on a commercial carrier.

(2) Description of the Related Art

Various security screening systems for use in the transportation industry are known in the art. Recent world events have led to demands for enhanced security throughout domestic and international transportation networks. Bill requiring the government to establish systems to screen, inspect or otherwise ensure that the security of all cargo that is to be transported in passenger aircraft and all cargo aircraft have been introduced in Congress. Current law requires improved security systems be implemented to screen cargo entering U.S. ports via ocean going vessels. U.S. government agencies have announced programs to enhance screening of freight shipped by rail and truck. All shipments to the United States arriving by sea from foreign ports are now subject to increased security regulations.

The government and the shipping and transportation industries are working to establish means to tighten security without disrupting the supply chain or increasing shipping costs such that commerce is significantly reduced. These efforts are directed to developing multi-level systems that include scientific risk assessment, as well as, x-ray scanning, computerized tomography (CT) scanning and sensor scanning. The aviation cargo industry has developed the "known shipper rule" whereby shippers with a known business history are allowed to ship packages on airplanes. This system, as it currently exists, is not designed to physically screen each package for contraband or explosives that may be mixed with legitimate articles or items originating from known shippers. Less than five percent (5%) of shipments originating from known shippers are subjected to any screening. In November 2003, the Transportation Security Administration (TSA) adopted a strategic plan that included priority actions directed to enhancing shipper and supply chain security and identifying technology for performing targeted air cargo inspections. Most recently the TSA published proposed rules implementing Congressional mandates for screening all property and cargo that will be carried on passenger aircraft operated by foreign or domestic air carriers as well as to establish a system to screen, inspect to ensure the security of freight transported by all cargo aircraft. 65 FR 65258, Nov. 10, 2004. The rules related to the known shipper program are intended to strengthen and codify the program.

One (1) of the deficiencies of x-ray and CT scanning systems is that the systems detect the shapes and outlines of the contents of the scanned package and require the system operator or screener to constantly make judgments from the scanned images about the contents of the packages. This results in an unacceptably high rate of error. Furthermore, screeners who do not have a high degree of training and experience, are unable to interpret the scanned images quickly and efficiently.

The related art has shown different systema for inspecting baggage to determine whether or not the baggage contains dangerous or illegal materials. Illustrative are U.S. Pat. Nos. 6,707,879; 6,721,391 and U.S. Publication No. 2005/0031076 A1 all to McClelland et al. The McClelland et al. references describe a system where baggage or other items are inspected at one location and information relating to the baggage or items including an image file can be accessed from a remote location. The information including the image file can be associated with the corresponding baggage or item by a unique item identifier. The information file can include additional information about the baggage or item or the owner of the baggage. The information for the baggage or item can be analyzed at the remote location to determine the screening result for the baggage or item.

The related art has also shown multi-level systems for inspecting baggage. Illustrative are U.S. Pat. Nos. 6,816,571 to Bijjani and U.S. Pat. No. 6,839,406 to Ries et al.

Bijgani et al describes a method or apparatus for analyzing an object which includes a prescanner which performs an initial scan on the item and a second scanner device that may perform a subsequent scan of one or more areas of interest within the item as determined based on the initial scan. The prescanning is conducted by an x-ray device and the subsequent scanning is performed by a computer tomography (CT) scan. The information from the second scan can be used to modify the information from the initial scan.

Ries et al describes a method and apparatus for detecting items in objects such as luggage. In this system, if a suspicious item in the object is detected, the object is sent to a second or higher detection level for further testing. The first level determines the location of the suspicious item, the second level uses the location data from the first level to focus the examination. At the second level, the entire object does not need to be scanned.

Also of interest are U.S. Publication Nos. 2003/0231739 A1 to Rosner and 2004/0017888 A1 to Seppi et al which describe methods and apparatuses for inspecting and scanning large objects such as baggage and cargo containers. Rosner uses x-rays to form an image of the object.

Only of minimal interest is U.S. Pat. No. 6,856,667 to Ellenbogen and U.S. Patent Publication No. 2004/0022356 A to Subotic et al. Ellenbogen describes an x-ray inspection system and a method of inspecting an item with the x-ray system. The x-ray system can be used to inspect a region of interest in the item. Subotic et al describes a three-dimensional, real-time, multi-phenomenology data reconstruction and fusion system and a method for scanning bags and luggage which blends 3-dimensional CT scanning with other sensing modularity.

There remains a need for a security screening system which does not significantly increase the retailer's packing time and which allows security personnel to quickly and accurately determine whether the contents of a package have been modified after the package has been packed by the retailer and before the package is shipped by commercial carrier by comparing an initial image of the contents of the package created when the package was packed with a second image of the contents of the packaging created by inspecting the package at the shipping station.

SUMMARY OF THE INVENTION

The present invention is a method and system for the security screening of cargo or packages prior to shipping of the cargo or packages on a commercial carrier. However, it is understood that the system can also be used by private carriers. The method and system identifies and separates cargo or packages in which the configuration of the contents of the package have been altered after packing which may indicate that the package includes explosives, hazardous material or other dangerous contraband. The packages are identified and separated before the packages are shipped by air, land or sea by any means of commercial carrier. The present method and system increases the efficiency and speed of security screening of large volumes of cargo or packages.

The system includes a first computer system and a second computer system. In one (1) embodiment, the first computer system is located at the packing station for the package. In one (1) embodiment, the first computer system includes a scanning device which is used to scan the package immediately upon packing to provide a first image showing the configuration of the contents of the package. The first image can be created by the retailer or the initial packer at the packing station. The first image can be created by the retailer as part of the initial order entry and packing process normally performed by the retailer and thus does not add extra time or expense for the retailer. In one (1) embodiment, the system uses the optimal packing system and method disclosed in U.S. Pat. No. 6,721,762 to Levine which determines the optimal packing configuration of the contents (articles or items) to be packed in the package. The first computer system creates a first image of the preferred packing configuration which depicts the appearance or configuration of the contents of the package as packed according to the optimal packing configuration. The second computer system is located at the shipping station at a point prior to the package being loaded onto a commercial carrier. The second computer system includes scanning equipment which scans the package prior to placing the package on the commercial carrier. The second computer system creates a second image depicting the packing configuration of the contents of the package just prior to placement of the package on the commercial carrier. In one (1) embodiment, the second computer system includes software that compares the initial first image of the initial configuration of the contents of the package with the scanned, second image showing the configuration of the contents of the package just prior to shipping. In one (1) embodiment where the first image is created using the optimal packing system and method, the second computer system compares the optimal configuration of the contents of the package as shown by the first image to the configuration of the contents of the package shown in the second image. The second computer system identifies any differences between the optimal configuration of the contents of the package and the configuration of the contents of the package shown in the second image as generated by the scanning equipment at the shipping station. The second computer system is capable of comparing a scan of a single view, multiple views or three-dimensional views. The second image and first image can also be visually compared by security personnel. Packages which have a scanned second image which differs beyond the preset parameters or preset amount from the initial first image are segregated for additional security screening or are not shipped.

Other information about the package can also be provided to the second computer system and can be compared with the corresponding information created during the packing of the package. The first image and other information on the package can be stored separate from the package and can be remotely accessed by the second computer system. The package can be assigned a tracking number to allow access to the data file associated with the package. The initial image and other information can also be transported with the package such as through use of a three-dimensional bar code affixed to the package. The second system is provided with a bar code reader which downloads the initial image and any other information from the bar code. The first image and other packing information can be encrypted to provide additional security. Additionally, the system is capable of operating in an enhanced security mode using encryption technology enabling a shipper or retailer to include an encrypted identifier in the original data file in addition to the readily observable package tracking identifiers customarily used on package shipments.

The present invention relates to a method for security screening a package, which comprises the steps of: providing a package having initial contents; providing a first image of the package showing the initial contents; sending the package to a shipping station to be shipped; scanning the package; creating a second image of the package showing the shipping contents; comparing the second image with the first image; and segregating the package if the second image differs at least a predetermined amount from the first image.

Further, the present invention relates to a method for security screening a package, which comprises the steps of: providing a package having initial contents; providing a first image of the initial contents of the package; storing the first image in a storage media; sending the package to a place to be shipped; scanning the package; creating a second image of the shipping contents of the package; retrieving the first image from the storage media; comparing the second image and the first image; and segregating the package if the second image differs a predetermined amount from the first image.

Still further, the present invention relates to a method for security screening a package, which comprises the steps of: providing a first image of a configuration of initial contents of the package; storing the first image in a storage media; sending the package to a shipping station; scanning the package prior to departure of the package from the shipping station; creating a second image of a configuration of the shipping contents of the package; retrieving the first image from the storage media; comparing the second image to the first image; and segregating the package if the second image differs at least a predetermined amount from the first image.

Further, the present invention relates to a system for security screening a package, which comprises: a first computer system having a first computer program for: creating and storing a first image of a configuration of the initial contents of the package; a scanner for scanning the package to determine a configuration of the shipping contents of the package and for creating a second image of the configuration of the shipping contents of the package prior to loading of the package onto a commercial vehicle; and a means for comparing the first image to the second image to determine whether the configuration of the initial contents of the package is essentially similar to the configuration of the shipping contents of the package.

The substances and advantages of the present invention will become increasingly apparent by reference to the following drawings and the description.

DETAILED DESCRIPTION OF THE PREFERRED EMBODIMENTS

Figure 1:
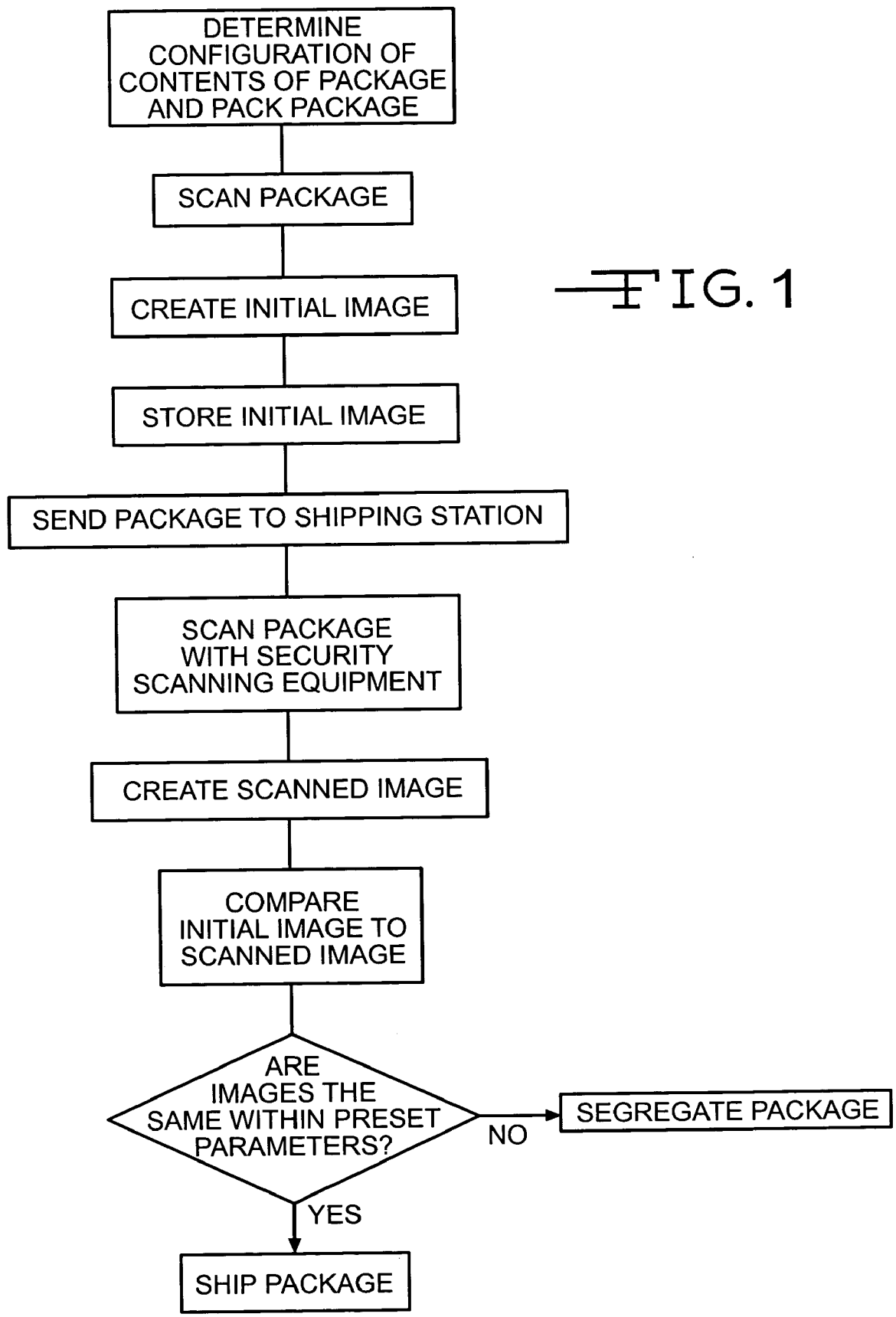
FIG. 1 is a flow chart showing the steps of the method of the present invention.

The security screening method and system 10 of the present invention allows for the screening of cargo and packages 150 prior to transportation of the packages 150 by air, land or sea using a commercial carrier. Prior to shipping of the package 150 by commercial carrier, the security screening method and system 10 determines whether the contents of the package 150 have been altered after the package 150 was packed. The package 150 can contain a variety of different sized and shaped items or articles. The security screening method and system 10 compares an initial or first image 102 of the arrangement or configuration of the contents of the package 150 created when the package 150 is packed with a scanned or second image 202 of the arrangement or configuration of the contents of the package 150 created by scanning the package 150 just prior to the loading of the package 150 onto the commercial carrier. The degree of discrepancy in the images 102 and 202 determines whether or not the package 150 will be loaded on the commercial carrier for shipping.

Figure 2:
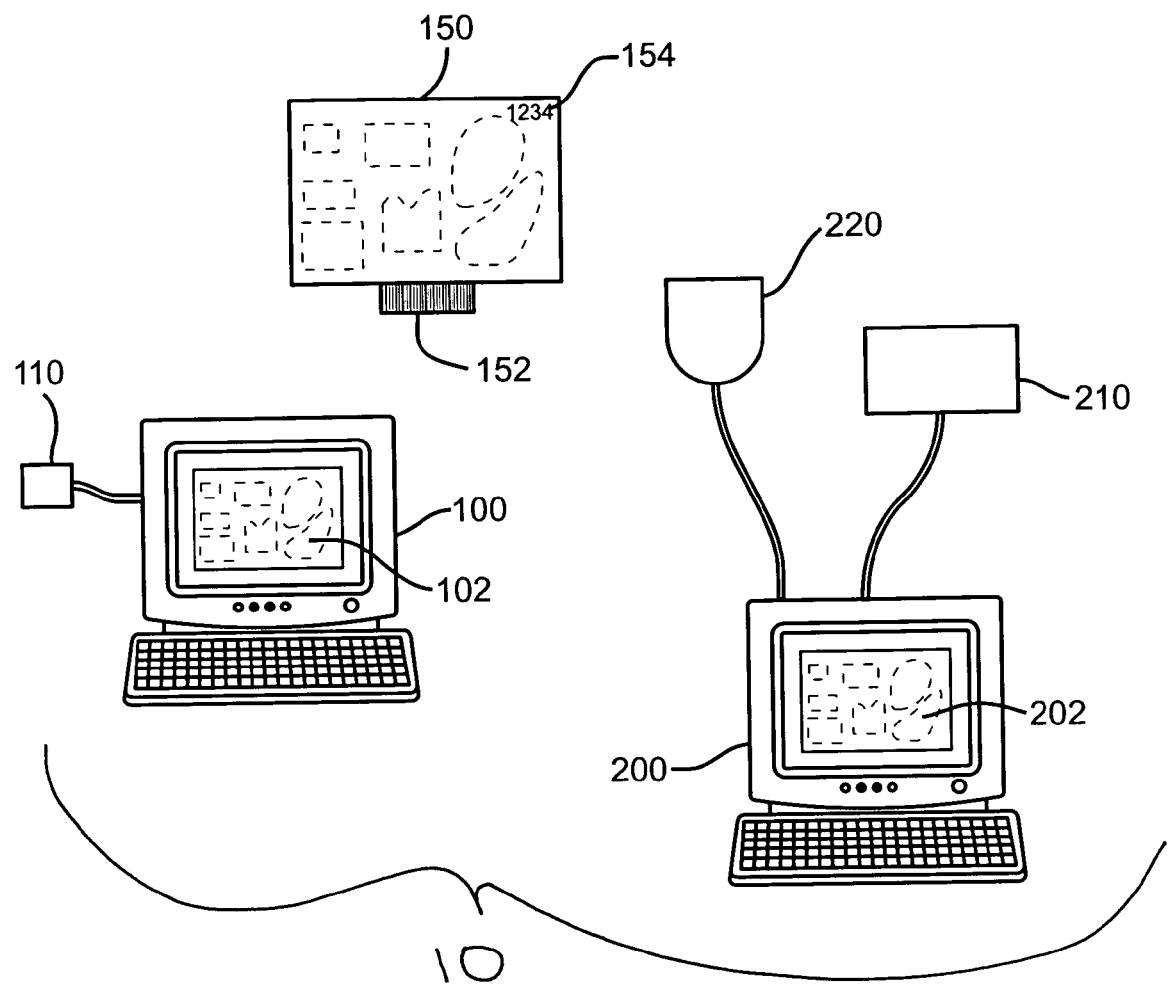
FIG. 2 is a schematic representation of the first and second computer systems 100 and 200 of the security screening system 10 of the present invention.
Figure 3:
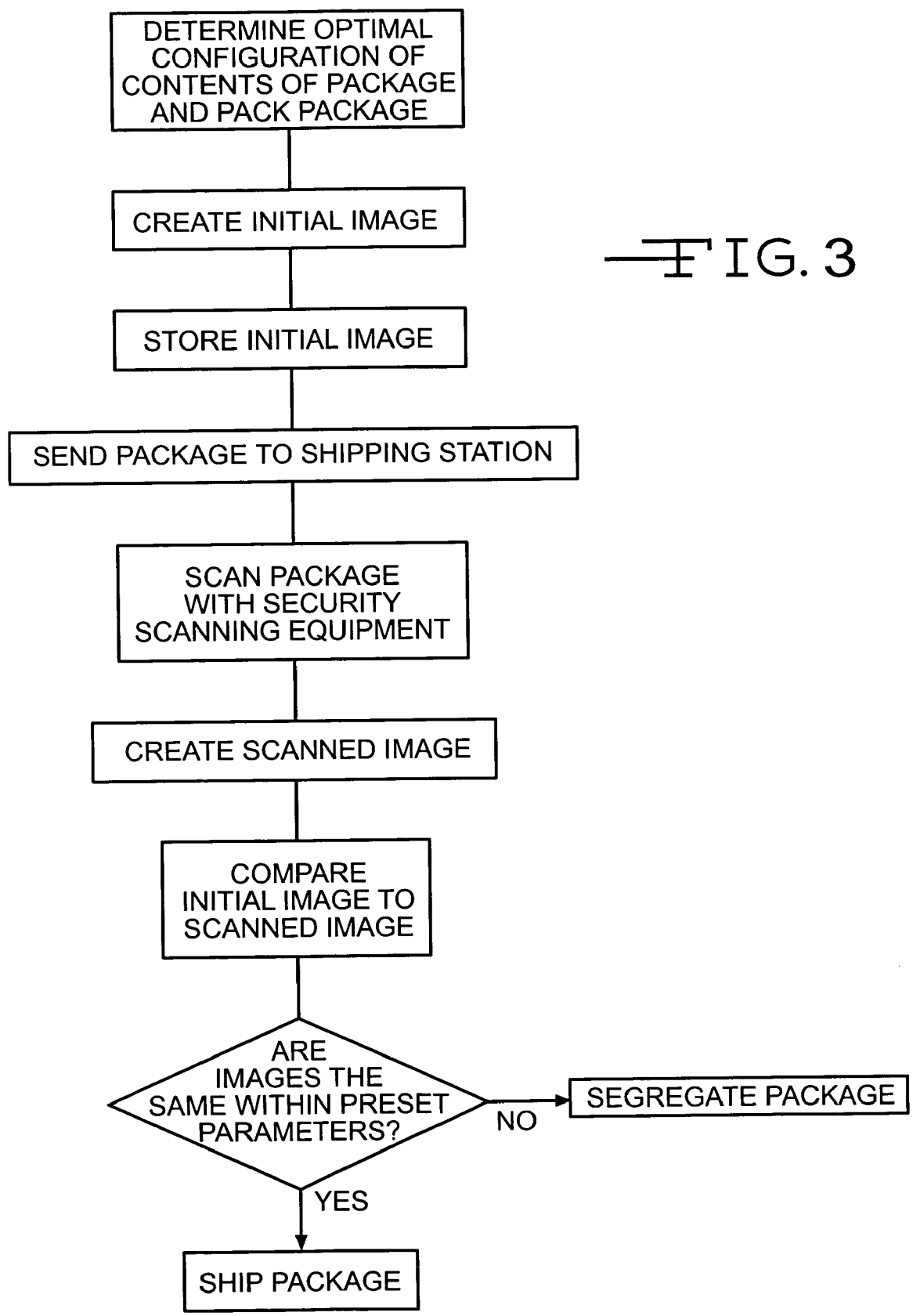
FIG. 3 is a flow chart showing the steps of another embodiment of the method of the present invention.

The security screening system 10 includes a first computer system 100 and a second computer system 200 or security screening system (FIG. 2). The first computer system 100 is located at the initial point of packing of the package 150. The first computer system 100 can be located at the original retailer or at a secondary location where the package 150 is packed for shipping such as a packing station. The package 150 may be packed by the shipper or the retailer. The second security screening system 200 is located at the shipping station where the package 150 is held prior to loading of the package 150 onto a commercial transportation vehicle such as an airplane, truck, ship or other vehicle. Preferably, the package 150 is security scanned directly before being loaded onto the commercial vehicle.

The first computer system 100 includes a central processing unit (CPU), input means, a storage media such as a hard drive or removable storage device and an output means such as a monitor. In one (1) embodiment, the first computer system 100 is similar to a standard computer system and includes at least a CPU, a hard drive, a keyboard and a monitor. In one (1) embodiment, the first computer system 100 includes scanning equipment 110 which is used to scan the package 150 to create a first or initial image 102 showing the initial packing pattern or configuration of the contents of the package 150 at the time the package 150 is packed. The first image 102 is created when the package 150 is packed. When the first image 102 is created, the first image 102 can be displayed on the monitor of the first computer system 100.

In one (1) embodiment, the first computer system 100 is part of an optimal packing system which includes a computer program such as that described in U.S. Pat. No. 6,721,762 to Levine which is hereby incorporated herein by reference in its entirety. The optimal packing system creates an optimal packing configuration for the package 150 based on the contents of the package 150. This optimal packing configuration is then used to arrange the contents of the package 150 during packing. In one (1) embodiment, the data for the optimal packing configuration is used to create the first image 102 showing the initial arrangement or configuration of the contents of the package 150. In this embodiment, where the first computer system 100 uses the optimal packing configuration to pack the contents of the package 150, the first computer system 100 does not include scanning equipment and the package 150 is not scanned to create the first image 102.

The first image 102 can contain multiple views. In one (1) embodiment, the first image 102 is a three-dimensional image. The data for the first image 102 can be stored in an original data file. The original data file can also contain other information about the package 150 such as the weight, size, and shape of the package 150, the number of items in the package 150, the contents of the package 150 and the destination of the package 150. The original data file can be stored on the hard drive or other storage media of the first computer system 100, on a removable storage media or in a database at a location remote from the first computer system 100. In one (1) embodiment, the package 150 is assigned a tracking number 154 which is affixed to the package 150. The original data file for the package 150 is stored using the tracking number 154. In one (1) embodiment, the data for the first image 102 is stored in a three-dimensional bar code 152 which is affixed to the package 150. The first computer system 100 could include a printing device which prints the bar code 152 directly on the package 150 or prints a label having the bar code 152 which is then affixed to the package 150.

The second computer system 200 includes a CPU, security scanning or inspection equipment 210, a storage media, and an output device. In one (1) embodiment, the second computer system 200 is similar to a standard computer system and includes at least a CPU, a hard drive, a keyboard, and a monitor. The security scanning equipment 210 allows for scanning the package 150 to create a second image or scanned image 202 of the configuration of the contents of the package 150. In one (1) embodiment, the security scanning equipment 210 is connected to the CPU of the second computer system 200 and the security scanning equipment 210 stores data for the second image 202 in a data file on the second computer system 200. In one (1) embodiment, the second computer system 200 only includes the security scanning equipment 210. In one (1) embodiment, the security scanning equipment 210 includes a storage media for storing the data for the second image 202. In one (1) embodiment, the data for the second image 202 is not stored and the second image 202 is only viewed in real time. The security scanning equipment 210 can include an X-ray imaging system, a CT machine, vapor detection systems or a magnetic resonance imaging (MRI) device or any other type of scanning or screening device well known in the art. The X-ray imaging system may use transmitted and/or scattered X-ray radiation. The security scanning equipment 210 can use a single or multiple view arrangement to construct the image. In one (1) embodiment, the type of image produced by the security scanning equipment 210 is similar to the type of image produced by the first computer system 100. In one (1) embodiment where the first computer system 100 includes scanning equipment 110, the scanning equipment 110 is similar or identical to the security scanning equipment 210 of the second computer system 200. In one (1) embodiment, the security scanning equipment 210 produces a three-dimensional view of the contents of the package 150. In one (1) embodiment, the second computer system 200 includes a bar code reader 220. The bar code reader 220 retrieves the data file having the first image 102 from the bar code 152 on the package 150 and downloads the data file into the second computer system 200. In another embodiment, where the second computer system 200 only includes the security scanning equipment 210, the bar code reader 220 downloads the data file from the bar code 152 directly into the security scanning equipment 210 and the first and second images 102 and 202 are visually compared by the security personnel using the security scanning equipment 210. If the bar code 152 contains additional information, this additional information retrieved from the original data file can be compared with the information obtained during the scanning of the package 150 by the security scanning equipment 210. In one (1) embodiment where the original data file having the first image 102 is stored on the first computer system 100 or in a separate database remote from the package 150, the data file can be remotely downloaded by the second computer system 200 such as over the internet. The first and second computer systems 100 and 200 can be linked such as via the internet to enable the second computer system 200 to download the original data file from the remote first computer system 100.

The first step of the method is to use the first computer system 100 to create an original data file containing information about the package 150. The data file is created at the packing station at the time and point when the contents of the package 150 are being packed. The original data file contains at least a first image 102 which represents the configuration of the contents of the package 150. The first image 102 can be created by screening or scanning the package 150 immediately upon packing of the package 150 at the retailers or at a packing station. In one (1) embodiment, the configuration of the contents of the package 150 is determined using a computer program to develop an optimal packing configuration. The package 150 is then packed based on this optimal packing configuration. The optimal packing configuration is then used as the first image 102. In this embodiment, the package 150 does not need to be initially scanned. Creating the first image 102 using the optimal packing configuration during packing ensures that the first image 102 is an accurate representation of the arrangement of the contents of the package 150. Creating the first image 102 while the package 150 is being packed, saves time and money in the shipping process in that the package 150 does not need to be scanned when it is initially packed and the first image 102 can be created as part of the original order process.

Once the data file for the package 150 is created, the data file is stored at a location where it is accessible by the second computer system 200. The package 150 is then shipped to the shipping station. The shipping system is remote from the packaging station. Thus, increasing the potential for tampering with the package. The shipping of the package from the packing station to the shipping station increases the accessability of the package to multiple persons. The package 150 is not loaded onto a commercial transport vehicle before it reaches the shipping station. Once the package 150 is at the shipping station, the package 150 is scanned to obtain the configuration of the contents of the package 150.

Next, the original data file for the package 150 is retrieved. In one (1) embodiment, the original data file for the package 150 is downloaded essentially simultaneously with the security screening of the package 150 at the shipping station. The original data file is downloaded to the security scanning equipment 210 or the second computer system 200 to which it is linked at the time the package 150 is scanned or submitted for security screening.

The original data file may be retrieved by remotely accessing the first computer system 100, by downloading the data file from the portable storage media or by reading the data file from the three-dimensional bar code 152 on the package 150. The three-dimensional bar code 152 is read at the time the package 150 is submitted for security screening or when it is scanned. If the data file is not physically connected to the package 150, a tracking number 154 is assigned to the package 150. The tracking number 154 is used to access the correct data file corresponding to the package 150. In addition to obtaining data on the configuration of the contents of the package 150, the scanning equipment 210 may also be used to obtain other information that may be stored in the data file. Once the data file has been retrieved, the information in the original data file is compared to the information obtained from the scanning equipment 210.

In one (1) embodiment, the second computer system 200 includes pattern recognition software and the data files having the first and second images 102 and 202 are downloaded into the second computer system 200 and the first and second images 102 and 202 are compared by the second computer system 200 using the pattern recognition software. Using pattern recognition software, the security scanning equipment 210 or the second computer system 200 compares the second scanned image 202 of the package 150 to the accompanying original data file that contains the first initial image 102 of the configuration or optimal packing configuration of the contents of the package 150. In another embodiment, the first image 102 and the second image 202 are downloaded into the second computer system 200 and the images 102 and 202 are displayed on a monitor of the second computer system 200 so that security personnel can visually compare the images 102 and 202. The security screeners or the second computer system 200 can determine from a comparison of the first and second images 102 and 202 whether the contents of the package 150 have been altered from the time the package 150 was packed until the time the package 150 reached the shipper. In addition, the information on the shipping label can be machine read and compared to the additional information included in the original data file accompanying the package 150.

The securing scanning equipment 210, the second computer system 200, or the security personnel will determine if there is a variation between the configuration of the contents of the package 150 as depicted by the first image 102 and the current or preshipping configuration of the contents of the package 150 as depicted by the second image 202 generated by the security scanning equipment 210. Upon comparing the first and second images 102 and 202, if the images 102 and 202 differ more than a predetermined amount or are not the same within preset parameters, then the package 150 is segregated and further security screening and scanning of the package 150 is conducted. When the system 10 finds a variance, it will signal an alert. The second computer system 200 will also signal an alert if a variation in the encrypted identifier on the package 150 is detected. Similarly, if the other information contained in the original data file such as package destination, package size or package weight varies from the scanned package weight, package size or the package destination currently stated on the label, then an alert will be signaled and the package 150 will be segregated.

It is intended that the foregoing description be only illustrative of the present invention and that the present invention be limited only by the hereinafter appended claims.

I claim:

1. A method for security screening a package, which comprises the steps of:
    (a) providing at a first packing station a package having initial contents which are different and packaged based upon a computer system recorded packaging configuration of the initial contents into the package;
    (b) providing a first image from the computer system of the package showing the initial contents based upon the packing;
    (c) sending the package to a shipping station for a commercial carrier remote from the first packing station to be shipped;
    (d) scanning the package at the remote shipping station;
    (e) creating a second image of the package from the scanning without opening the package showing the contents;
    (f) comparing the second image with the first image by remotely accessing the first computer image; and
    (g) segregating the package if the second image differs at least a predetermined amount from the first image.

2. The method of claim 1 wherein in step (a), an optimal packing configuration of the initial contents is determined using an optimal packing method and system and wherein the initial contents are packed in the package using the optimal packing configuration.

3. The method of claim 2 wherein in step (b), the optimal packing method and system creates the first image based on the optimal packing configuration.

4. The method of claim 1 wherein the first image is a three-dimensional image.

5. The method of claim 1 wherein the first image contains multiple views.

6. The method of claim 1 wherein after step (b), the first image is stored as a three-dimensional bar code which is affixed to the package.

7. The method of claim 6 wherein the three-dimensional bar code contains other information such as package destination, package size and package weight.

8. The method of claim 1 wherein in step (f), the first image and the second image are compared using a computer program having pattern recognition features.

9. The method of claim 1 wherein in step (f), the first image and the second image are visually compared.

10. The method of claim 1 wherein after step (f), if the second image differs from the first image less than the predetermined amount, the package is shipped.

11. The method of claim 1 wherein after step (b), the first image is stored in a database spaced apart from the package and the package is provided with a tracking number and wherein in step (f), the tracking number is used to retrieve the first image from the database.

12. The method of claim 1 wherein the first image is created when the initial contents are packed into the package.

13. The method of claim 1 wherein the first image shows a configuration of the initial contents of the package and the second image shows a configuration of the shipping contents of the package and wherein in step (f), the configuration of the initial contents of the package is compared with the configuration of the shipping contents of the package.

14. The method of claim 1 wherein a CT scanner is provided at the shipping station and wherein in step (d), the package is scanned using the CT scanner.

15. The method of claim 1 wherein an X-ray machine is provided at the shipping station and wherein in step (d), the package is scanned using the X-ray machine.

16. The method of claim 1 wherein the package is shipped under the known shipper rule.

17. A method for security screening a package, which comprises the steps of:
    (a) providing at a first packing station a package having initial contents which are different and packaged based upon a computer system recorded packaging configuration of the initial contents into the package;
    (b) providing a first image from the computer system of the initial contents based upon the packing;
    (c) storing the first image in a storage media;
    (d) sending the package to a remote place from the first packing station to be shipped;
    (e) scanning the package at the remote place;
    (f) creating a second image of the shipping contents of the package from the scanning;
    (g) retrieving the first image from the storage media;
    (h) comparing the second image and the first image by remotely accessing the first image; and
    (i) segregating the package if the second image differs a predetermined amount from the first.

18. The method of claim 17 wherein in step (a), an optimal packing configuration of the initial contents is determined using an optimal packing method and system and wherein the initial contents are packed in the package using the optimal packing configuration.

19. The method of claim 18 wherein in step (b), the first image is created based on the optimal packing configuration.

20. The method of claim 17 wherein the first image and the second image are three-dimensional images.

21. The method of claim 17 wherein the first image and the second image contain multiple views.

22. The method of claim 17 wherein in step (b), the storage media is a three-dimensional bar code which is affixed to the package.

23. The method of claim 22 wherein the three-dimensional bar code contains other information such as package destination, package size and package weight.

24. The method of claim 17 wherein in step (g), the first image and the second image are compared using a computer program having pattern recognition features.

25. The method of claim 17 wherein in step (g), the first image and the second image are visually compared.

26. The method of claim 17 wherein after step (g), if the second image differs from the first image less than the predetermined amount, then the package is shipped.

27. The method of claim 17 wherein after step (b), the storage media is a database spaced apart from the package and the package is provided with a tracking number and wherein in step (f), the tracking number is used to retrieve the first image from the database.

28. The method of claim 17 wherein the first image is created when the initial contents are packed in the package.

29. The method of claim 17 wherein the first image shows a configuration of the initial contents of the package and the second image shows a configuration of the shipping contents of the package and wherein in step (g), the configuration of the initial contents of the package is compared with the configuration of the shipping contents of the package.

30. The method of claim 17 wherein a CT scanner is provided at the shipping station and wherein in step (d), the package is scanned using the CT scanner.

31. The method of claim 17 wherein an X-ray machine is provided at the shipping station and wherein in step (d), the package is scanned using the X-ray machine.

32. A method for security screening a package, which comprises the steps of:
    (a) providing a first image of a configuration of initial contents which are different and based upon packing of the package at a first packing station;
    (b) storing the first image in a storage media;
    (c) sending the package to a shipping station remote from the first packing station;
    (d) scanning the package at the remote shipping station prior to departure of the package from the shipping station;
    (e) creating a second image of a configuration of the shipping contents of the package;
    (f) retrieving the first image from the storage media;
    (g) comparing the second image to the first image by remotely accessing the first image; and
    (h) segregating the package if the second image differs at least a predetermined amount from the first computer image.

33. The method of claim 32 wherein in step (a), the first image is created when the initial contents of the package are packed in the package using an optimal packing method and system.

34. The method of claim 32 wherein a scanner connected to a computer system having pattern recognition software is provided, wherein in step (d), the package is scanned using the scanner and the second image is stored in the computer system, wherein, in step (f), the first image is retrieved and stored in the computer system and wherein in step (g), the second image and the first image are compared using the pattern recognition software of the computer system.

35. A system for security screening a package, which comprises:
    (a) a first computer system having a first computer program for:
        (i) creating and storing a first image of a configuration of the initial contents of the package which are different and based upon packaging recorded on a computer system;
    (b) a scanner for scanning the package at a remote shipping station to determine a configuration of the shipping contents of the package and for creating a second computer image of the configuration from the scanning showing the shipping contents of the package prior to loading of the package onto a commercial vehicle; and
    (c) a means for comparing the first image to the second image to determine whether the configuration of the initial contents of the package is essentially similar to the configuration of the shipping contents of the package.

36. The system of claim 35 wherein the means for comparing the first image to the second image is a second computer system having pattern recognition software.

37. The system of claim 35 wherein the means for comparing the first image to the second image is visual comparison.

38. The system of claim 35 wherein the scanner is a three-dimensional scanner.

39. The system of claim 35 wherein the first image is stored in a three-dimensional bar code affixed to the package.

40. The system of claim 39 wherein a bar code reader is provided to retrieve information stored in the bar code.

41. The system of claim 35 wherein the first computer program encrypts the first image before storing the first image.

42. The system of claim 35 wherein the first computer program stores other information such as package size, package weight, package contents and package destination with the first image.

43. The system of claim 35 wherein the first computer system includes an optimal packing computer program which determines an optimal packing configuration for the initial contents of the package and wherein the first computer system creates the first image using data generated by the optimal packing computer program.

44. The system of claim 35 wherein the package is to be shipped under the known shipper rule.

* * * * *